United States Patent [19]

Shultz

[11] Patent Number: 5,270,064
[45] Date of Patent: Dec. 14, 1993

[54] ENCAPSULATED FOOD PRODUCT WITH READILY REMOVABLE CAPSULE

[75] Inventor: Fred T. Shultz, Sonoma, Calif.

[73] Assignee: Avian Allure, Sonoma, Calif.

[21] Appl. No.: 685,075

[22] Filed: Apr. 12, 1991

[51] Int. Cl.⁵ .................................................. A23L 1/00
[52] U.S. Cl. ........................................... 426/90; 426/93; 426/99; 426/803; 426/805; 426/808; 426/811; 426/132
[58] Field of Search ............... 426/89, 90, 96, 99, 426/104, 125, 135, 138, 803, 805, 93, 132, 808, 811

[56] References Cited

U.S. PATENT DOCUMENTS

| | | | |
|---|---|---|---|
| 148,632 | 3/1874 | Tompkins | 426/805 |
| 365,995 | 9/1887 | Heins | 426/805 |
| 1,382,601 | 6/1921 | Cressey | 426/93 |
| 1,638,963 | 8/1927 | Schreiber | 426/89 |
| 1,794,741 | 3/1931 | Thompson | 426/132 |
| 1,997,083 | 4/1935 | Robison | 426/805 |
| 2,181,109 | 11/1939 | Dodge | 426/93 |
| 2,631,938 | 3/1953 | Miers et al. | 426/93 |
| 2,821,477 | 1/1958 | Forkner | 426/93 |
| 2,868,656 | 1/1959 | Patten | 426/125 |
| 2,955,043 | 10/1960 | Rosenthal | 426/125 |
| 3,080,285 | 3/1963 | Odenwald et al. | 426/805 |
| 3,136,640 | 6/1964 | Rabinovitch | 426/805 |
| 3,145,111 | 8/1964 | Norton | 426/125 |
| 3,323,922 | 6/1967 | Durst | 426/89 |
| 3,362,831 | 1/1968 | Szczesniak | 426/104 |
| 3,471,303 | 10/1969 | Hamdy et al. | 426/89 |
| 3,471,304 | 10/1969 | Hamdy et al. | 426/89 |
| 3,719,497 | 3/1973 | Galle et al. | 426/803 |
| 3,808,340 | 4/1974 | Palmer | 426/805 |
| 3,818,947 | 6/1974 | Rose | 426/135 |
| 3,872,229 | 3/1975 | Durst et al. | 426/104 |
| 3,930,031 | 12/1975 | Kealy | 426/805 |
| 4,029,821 | 6/1977 | Munro | 426/805 |
| 4,053,650 | 10/1977 | Chino et al. | 426/93 |
| 4,366,175 | 12/1982 | Brown et al. | 426/805 |
| 4,499,113 | 2/1985 | Mochizuki et al. | 426/93 |
| 4,508,741 | 4/1985 | Corbett | 426/805 |
| 4,915,971 | 4/1990 | Fennema et al. | 426/89 |
| 4,942,043 | 7/1990 | Sander | 426/93 |

FOREIGN PATENT DOCUMENTS

| | | | |
|---|---|---|---|
| 0088574 | 9/1983 | European Pat. Off. | |
| 3531201 | 3/1987 | Fed. Rep. of Germany | 426/805 |
| 60-153764 | 8/1985 | Japan | 426/805 |
| 62-296847 | 12/1987 | Japan | 426/805 |
| 254497 | 7/1926 | United Kingdom | 426/805 |

*Primary Examiner*—Steven Weinstein
*Attorney, Agent, or Firm*—Webb, Burden, Ziesenheim & Webb

[57] ABSTRACT

An encapsulated food product for any type of animal has a readily removable non-food capsule surrounding an edible core. An interface between the capsule and core facilitates separation of the capsule and edible core. The capsule is fabricated to facilitate separation from the interface and core as two or more pieces. The invention encompasses simulated seeds and simulated nuts for the animal food industry and snacks for primates including humans.

5 Claims, 1 Drawing Sheet

ENCAPSULATED FOOD PRODUCT WITH READILY REMOVABLE CAPSULE

FIELD OF THE INVENTION

The invention pertains to artificial seeds and nuts for consumption by animals, including birds, reptiles, crustaceans, mammals and humans, and to snack foods in general.

BACKGROUND OF THE INVENTION

Various types of shell-intact seeds form a large part of the diet of many different kinds of birds. It is well known that seed eating birds are remarkably adept at shelling seeds, dropping the shell over the sides of the beak, and then eating the edible interior. Often the edible portion is swallowed whole after shelling. Many seeds which might be thought of as shell-free in fact constitute an edible core surrounded by a thin shell. Even very small seeds of this type (millet, for example) are usually "shelled" by the beak of the bird before the bird eats the edible core.

Birds which shell seeds before eating them usually, if not always, eat other particulate foods this same way. For example, Indian Ringnecks—for which seeds are a large part of the diet in the wild—consume manufactured feed pellets by cracking and discarding the outside portion of the pellet and consuming the interior. This method of eating feed pellets leaves "fines" (small particles of feed) which this type as well as many other types of bird will not eat unless starved into doing so.

Wastage of food when birds eat non-seed foods is by no means the greatest problem associated with birds which exhibit this "seed shelling" type of feeding behavior. For example, vitamin supplements and other medicaments are often available only in the form of liquids or powders to be added to the drinking water or to be sprinkled over other feed forms including seeds. Neither approach assures that the bird will ingest the intended dose. Drinking water consumption is difficult to predict, and any medicament sprinkled onto or even coated over a food particle is likely to be discarded by the seed shelling feeding behavior. An example of a bird feed which is coated with a vitamin mix is "Blair's SUPER PREEN Seedlets," a millet seed product in which each individual seed is coated with a mix of vitamins, minerals, amino acids, electrolytes, and other nutrients, as produced and marketed by RHB Laboratories, Inc., Santa Anna, Calif. 92706. Presumably, the nutrient mix is applied by standard coating techniques in amounts in excess of dosing requirements, since those in the industry are well aware that birds which eat millet eat only the core of the millet.

Even the exotic seed-eating birds, which otherwise have a great learning capacity, seem unable to distinguish particulate foods from seeds for the purpose of establishing a differential eating behavior. Some birds which eat fruits and vegetables, by taking them apart piece by piece and eating with minimal waste, treat individual food particles as if they were seeds and "shell" them (whether there is a shell present or not) before swallowing.

In view of the foregoing, a need persists for a manufactured bird feed which is particularly adapted to the inalterable shelling behavior of birds. Such a product would have similar applications for feed products for animals other than birds including reptiles, crustaceans and mammals. Such a product would be readily adapted for use as a snack food for humans and other primates.

SUMMARY OF THE INVENTION

In order to meet this need, the present invention is an encapsulated food product comprised of three parts: an edible core, an outer detachable shell and an interface between the core and the shell. The shell is constructed so as to crack or be torn into two or more removable segments. The interface is formulated so as to facilitate removal of the shell from the core upon cracking or rupture of the shell. The shell and interface are preferably fabricated of inexpensive food grade materials, whereas the nutrient and/or medication concentration of the manufactured food product is within the core. Nutrients and/or medicaments are included in the core, to minimize waste and to enable more precise dosing than has previously been possible.

DETAILED DESCRIPTION OF THE INVENTION

Figure 1:
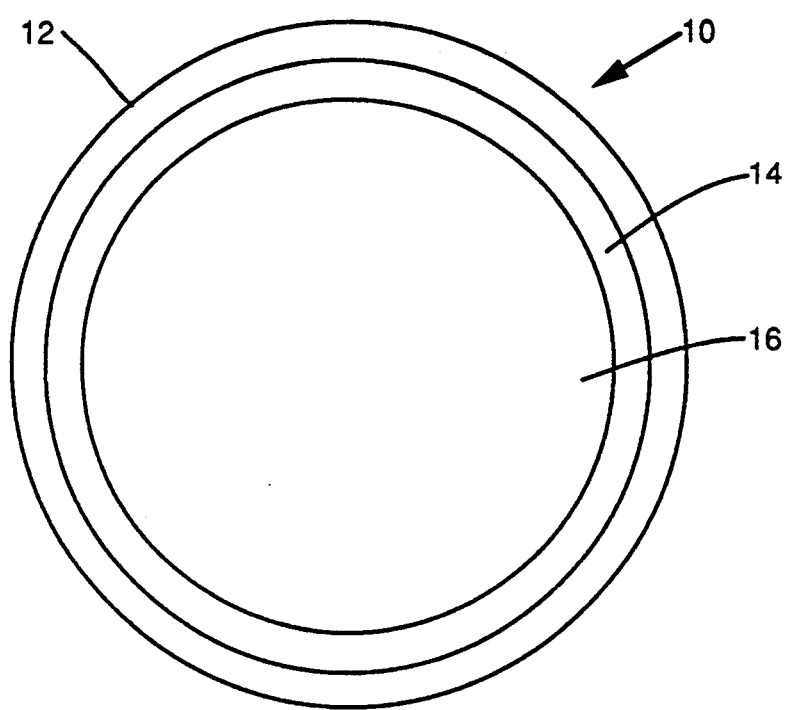
FIG. 1 is an illustration in section of the encapsulated food product of the present invention.

Birds which eat food particles by removing the shells (even if the food particle is a pellet and there is no shell present) are not the only living beings who are addicted to or at least fascinated with shelled edibles. Pet animals such as the various rodents (rabbits, chipmunks, hampsters, etc.) are beloved for their antics when they shell and consume peanuts and other nuts and seeds. Nor would anyone dispute that many people prefer to crack seeds or nuts such as sunflower seeds and almonds even when a wide variety of processed versions of these foods are readily available. Among the many reasons why people enjoy nuts or seeds with shells—enjoyment, challenge, etc.—one reason has to do with the "packaging" that a shell supplies. Just as many fruits come in their own protective carrying cases, nuts or seeds with shells need no other package prior to transport, and hikers, campers, armed services personnel and even city travelers can transport such foods without risk of contamination or degradation.

The present invention is therefore not only a product and method for making artificial seeds and nuts for bird or animal consumption, but is a method of making related encapsulated food products for all kinds of uses. The invention therefore has to do generally with edible particles which are contained within a protective, easily-removable shell.

The shell is never intended for consumption (notwithstanding the fact that the shell should be formulated so that accidental ingestion would not be disastrous). Thus the invention is entirely different in concept from the well-known prior art of candy coated foods and snacks in which the coating is intended to be eaten. In the context of the present invention, the shell is a non-food construct. While it is admitted that what constitutes food and what does not is susceptible to slight cultural variation, the inventor contemplates the understanding of "non-food construct" that would be readily understood as such in the customs of 1990's cultures in the western hemisphere.

The actual edible portion of the encapsulated food product of the present invention may be a manufactured particle which resembles the composition of a seed or nut or may be any other edible core of composite foods or nutrients, non-nutrient fillers, medicants, or combinations thereof. The core of the present invention is a manufactured, composite core: the present invention does not contemplate merely the provision of manufactured shells to naturally occurring particulate food although this is not excluded. Encapsulated food products for human consumption may include composite cores such as resemble breakfast cereals or other snack foods, and encapsulated food products for animals and birds may contain manufactured cores more particularly designed for the animal's or bird's specific needs (vitamin supplements, medicaments, etc.). The cores may include low or no-calorie fibers or fillers, or the entire core may be so composed. The core may be hard or soft and chewy. In addition to virtually any processible food which can be included within a composite food particle, the following edible constituents may be used to give particular characteristics to the core composition: gluten, starched, sugars, honey, alginate, agar, casein, carrageenan, dextran, vitamins, minerals, nutrient polymers, polyethylene glycol, albumin and other proteins, glycerol, vegetable oils, fat, mineral oil, antioxidants, electrolytes, bacteria inhibitors, mold inhibitors, and other substances.

The non-food shell for the edible particulate core is generally hard (or at least stiff) and may or may not have some resistance to water penetration. The shell of the preferred embodiment of the invention will range from the softness but cohesiveness of a peanut shell to the hardness characteristic of a fresh, unroasted sunflower seed shell.

The usual way of forming the shell is by coating a polymerizable substance onto the core (with its interface, discussed below) and the polymerizable coating may contain, without limitation: methylcellulose, ethylcellulose, carboxymethylcellulose, cellulose acetate, cellulose acetate butyrate, cellulose acetate phthalate, nitrocellulose, hydroxy-propylcellulose, cellulose derivatives in general, alginate in various forms, gelatin, casein, succinylated gelatin, agar, carrageenan, gum arabic, guar gum and other gums, bark, arabinogalactan, various sugars, honey, peanut hulls, sunflower hulls, other seed or nut hulls including rice, rice bran, wheat bran, gluten, zein, albumin, diatomaceous earth, various starches, various dyes and pigments, corn meal, various cereal meals, pasta flours, shellac, various waxes or paraffins, papier mache, plaster of paris, hardening agents known in the art, shredded wheat and other breakfast cereals, proteins, phenolic resins, polyurethane, polyethylene, nylon, chitosan, surfactants, expanded mineral products such as vermiculite, pearlite and rock wool.

Although the shell may contain constituents which might be thought of as edible, such constituents usually if not always being chosen for their low cost, these ingredients are not present in the shell to a degree that renders the shell a food construct. Notwithstanding the presence of shredded wheat, for example, the hard shell of the present encapsulated food product remains a non-food item which, although not fatal if swallowed, is not intended or even particularly suited for consumption by animals or humans.

Encapsulated food products according to the invention range in size from 0.1-15 cm, preferably 0.05-5 cm, and most preferably 0.1-4 cm. These dimensions apply even when the particle is not spherical in shape.

An essential aspect of the present invention is the feature whereby the shell of the encapsulated food product is readily removable in two or more segments. The shell may or may not be pre-scored. In the preferred embodiment of the invention, the ready removability of the shell is attributable to an interface layer between the core and the shell of the encapsulated food product. The interface is any layer which minimizes adherence between the intact shell and the edible core, so that when the shell becomes cracked it will tend to fall off. The interface layer of the preferred embodiment generally comprises an edible oil mixed with (or layered with) an edible dry powder. The interface may include, without limitation, talc, cereal flours, diatomaceous earth, powdered sugar, peanut oil, safflower oil, various vegetable oils, mineral oil, various edible oils other than vegetable oils, ground peanut hulls, ground sunflower shells, other ground nuts or shells, various flavorings, various dyes and pigments, citric acid, phosphoric acid, lecithin, butylated hydroxytoluene (BHT) and antioxidant compositions.

Although the interface is usually a layer between the core and the shell, the interface of the present invention may also comprise the presence, in the core, of substances which cause low adherence between the core and the shell. Exemplary substances are polyethylene glycol, silicates with high lubricity, nylon, alginates and edible long chain polymers such as hydrated polysaccharides.

When the interface comprises an edible oil and a dry fine particulate, usually the edible core is coated with the edible oil, and the dry fine particulate is then contacted onto the surface of the edible oil coating. This type of interface layer is present in the preferred embodiment of the invention.

In order to fabricate the present product, whether simulated seed, simulated nut or other encapsulated food product, coating technology well known in the art is suited for preparing the interface and shell coatings, and extrusion granulation and other techniques known in the art are suitable for preparing the edible cores. Even though these processes are well known, the present invention is the first to harness them in the preparation of artificial seeds, artificial nuts and other food products encapsulated in a non-food shell.

In an alternate embodiment of the invention, the shell may be preformed and assembled with the interface and core.

Because a bird or animal may chew or at least bite the edible core, the core of the present encapsulated food product or simulated seed or simulated nut should not have an objectionable flavor. The taste of the core may be improved by the addition of other feed ingredients such as sugars, honey, flowers, ground peanuts and/or other nuts or various flavor aids.

Specific examples given below will further illustrate the invention.

EXAMPLE I

Approximately 480 commercially available spherical cores of composite bird feed, sphere diameter ranging from 5 to 8 mm, were placed in a coating pan with 2.5 ml of peanut oil. The approximately 480 cores had a volume of 100 cc. The coating pan was rotated at 30 rpm to effect uniform coating of the peanut oil onto the cores. The cores were then dusted with 18 grams of wheat flour, during rotation, to form a peanut oil/wheat flour interface layer on the spherical cores. The cores with the interface were then coated, during rotation, with 40 ml of a solution containing 5 parts of a 2% solution of methylcellulose (sigma viscosity at 25° C. of 25 centipoises) and 1 part ethylcellulose, plus tiny amounts of yellow and red food dyes to give an orange color. The resulting product is illustrated in section in FIG. 1, which shows in schematic section the encapsulated food product 10 having the core 16, the interface 14 and the shell 12.

EXAMPLE II

Example I was repeated except that 16 g of peanut oil and 9 g of wheat flour were used to form the interface. The shell was formed by applying an inner coat of 40 ml of methyl/ethylcellulose with yellow food dye, followed by a middle layer consisting of 75 ml of methyl/ethylcellulose and 15 g of wheat gluten, followed by a finish coat of 36 ml of methyl/ethylcellulose.

EXAMPLE III

Example II was repeated except that 3 ml of peanut oil and 36 g of powdered talc were used to form the interface. The shell was formed with the inner layer of the shell consisting of 50 ml of methyl/ethylcellulose, followed by a middle layer consisting of 80 ml of methyl/ethylcellulose and 50 g of wheat gluten, followed by a finish layer of 20 ml of methyl/ethylcellulose.

EXAMPLE IV

The process of Example III was repeated except that 4 ml of peanut oil and an excess of talc (over 50 g) were used to form the interface. The excess of talc was used to test the effect of excess particulate in the interface on quality of subsequent coating, and no problems were encountered. The shell was formed with an inner layer of 10 ml of methyl/ethylcellulose with red dye, a middle layer consisting of 120 ml of methyl/ethylcellulose and 40 g of wheat gluten, and a finish layer of 50 ml of methyl/ethylcellulose.

EXAMPLE V

Oddly shaped cores were selected: "all-in-one" exotic bird breeder ration pellets having an odd shape were obtained from Roudybush in Templeton, Calif. These cores had a cylinder shape with a diameter of 4.5 mm and a length ranging from 4 to 10 mm with an average of 5.5 mm. There were approximately 650 cores with a surface area of approximately 600 square cm in 100 cc volume. The cylinders were coated, with the following exceptions, according to Example III. 3 ml of peanut oil and 32 g of talc were used. The shell was formed with an inner layer of 10 ml of methyl/ethylcellulose with an orange dye, a middle layer of 120 ml of methyl/ethylcellulose and 32 g of wheat gluten, with a finish layer of 65 ml of methyl/ethylcellulose.

EXAMPLE VI

Example III was repeated with 3 ml of peanut oil, 44 g of talc, and the shell was formed with an inner layer of 40 ml of methyl/ethylcellulose with no dye, a middle layer of 170 ml of methyl/ethylcellulose and 30 g of ground peanut hulls, with a finish layer of 30 ml of methyl/ethylcellulose.

EXAMPLE VII

Example VI was repeated except that an additional coat of 120 ml of methyl/ethylcellulose with a yellow dye was added to give a different surface color and texture.

EXAMPLE VIII

Example III was repeated with 3 ml of peanut oil and 34 g of talc to form the interface. The shell was formed with an inner layer of 25 ml of methyl/ethylcellulose with orange dye, a middle layer of 100 ml of methyl/ethylcellulose and 35 g of dry papier mache (Celluclay from Activa Products, Inc., Marshall, Tex.) and a finish layer of 40 ml of methyl/ethylcellulose.

EXAMPLE IX

Example III was repeated with 40 ml of peanut oil and 50 g of talc to form the interface. The shell was formed using a coating material composed of 5 parts of a 4% solution of Methocel A15LV Premium Grade (Dow Chemical Company, Midland, Mich.) and 2 parts Aquacoat (FMC Corporation) with an orange dye.

EXAMPLE X

Nutritive cores were prepared by mixing 5 parts of a vitamin premix powder with 1 part wheat gluten as a binder, granulating using water as the liquid (80 g of water per 120 g of powder) to form more or less spherical balls, followed by air drying. Cores having diameters between 4 and 6 mm were formed (approximately 800 cores per 100 cc with a surface area of approximately 620 square cm). The cores were coated with an interface comprising 2 ml of peanut oil and 9 g of a powder made up of 7 parts talc and 3 parts powdered sugar. The shell was formed with the coating material used in the previous Example.

EXAMPLE XI

The product of Example III was prepared with 3 ml of peanut oil and 30 g of talc. The 3 ml of peanut oil and 30 g of talc per 100 cc of cores provides the most preferred embodiment of the interface of the present invention. The shell was formed with an inner layer of 60 ml of a coating comprised of 4 parts methylcellulose (Sigma) to 1 part Aquacoat (FMC ethylcellulose), with blue dye, a middle layer of 200 ml of methyl/ethylcellulose with 40 g of shredded wheat cereal (Nabisco) followed by 55 g of methyl/ethylcellulose with 15 g of ground peanut hulls, and a finish coat of 40 ml of methyl/ethylcellulose.

EXAMPLE XII

Example III was repeated with the following changes. 4 ml of peanut oil and 17 g of talc/powdered sugar in the ratio of 7:3 was used to form the interface. The shell was formed using a coating material composed of 3 parts of a 1% solution of Methocel A4M Premium Grade (Dow) and 1 part Aquacoat (FMC) with a red-yellow-blue-orange dye combination added to yield a medium brown color. The shell is formed with an inner layer of 40 ml methyl/ethylcellulose,, a middle layer of 120 ml methyl/ethylcellulose with 19 g of wheat bran flakes, and a finish coat of 40 ml of methyl/ethylcellulose.

EXAMPLE XIII

Shelled sunflower seeds approximately 9×4×2 mm were immersed in a 2% solution of iodized table salt for 10 minutes, drained and air dried. These cores were placed in a rotating pan and sprayed with an additional 15 ml of the salt solution per 100 cc (approximately 1050 cores) of cores. The salt and natural external layer of the sunflower seeds constituted the interface. The shell was formed with an inner layer of 50 ml of 2% methyl-/ethylcellulose with orange dye and 7 g of wheat gluton, a middle layer of 100 ml of methyl/ethylcellulose and 15 g of wheat bran flakes, an outer layer of 100 ml of methyl/ethylcellulose and 25 g of ground peanut hulls, and a finish layer of 50 ml of methyl/ethylcellulose.

The invention has been described with particularity above, but is intended to be limited only insofar as is set forth in the accompanying claims.

I claim:

1. A simulated bird seed supplement product formed as a coated composite and comprising:

a simulated bird seed edible particulate inner core of a material for consumption by birds and configured to simulate bird seed, said inner core coated by or impregnated with a medicament or an additional nutrient for bird consumption;

an interface layer enclosing the core and the medicament or additional nutrient and intimately contacting substantially all of the outer surface of the core; and a non-food outer coating enclosing the core/interface composite and formed thereabout after the core-/interface composite has been formed, said outer coating configured to simulate a bird seed shell for said simulated bird seed edible particulate core, with said coating including substantially no medicaments or additional nutrients therein, with substantially the entire inner surface of said coating intimately contacting the core/interface composite and leaving substantially no space between the coating and the core/interface composite, with the coating formulated to be crackable and separable into at least two removable segments, wherein said interface layer is formulated to minimize adherence between the core and the outer coating, so that when the coating becomes cracked it will tend to fall off.

2. The simulated birdseed supplement product according to claim 1 wherein said coating includes cellulose as a constituent thereof.

3. The simulated birdseed supplement product according to claim 1 wherein said interface layer further comprises an edible oil and a quantity of fine particulate material.

4. The simulated birdseed supplement product according to claim 1 wherein said coating has at least some resistance to water and has a hardness at least that characteristic of a peanut shell.

5. The simulated birdseed supplement product according to claim 1 wherein said interface layer comprises a mixture of peanut oil and wheat flour and said non-food outer coating comprises a mixture of methylcellulose and ethylcellulose.

* * * * *